United States Patent
Savoy

(10) Patent No.: US 7,469,473 B2
(45) Date of Patent: Dec. 30, 2008

(54) ASSEMBLY LINE VEHICLE BODY POSITIONING

(75) Inventor: Mark A. Savoy, Metamora, MI (US)

(73) Assignee: Utica Enterprises, Inc., Shelby Township, Macomb County, MI (US)

( * ) Notice: Subject to any disclaimer, the term of this patent is extended or adjusted under 35 U.S.C. 154(b) by 0 days.

(21) Appl. No.: 11/758,226

(22) Filed: Jun. 5, 2007

(65) Prior Publication Data

US 2008/0000069 A1    Jan. 3, 2008

Related U.S. Application Data

(60) Provisional application No. 60/817,222, filed on Jun. 28, 2006.

(51) Int. Cl.
 B21D 53/00 (2006.01)
 B23P 21/00 (2006.01)
(52) U.S. Cl. .................... 29/897.2; 29/430; 29/464; 29/559; 29/784; 29/799; 29/281.1; 269/297; 269/909
(58) Field of Classification Search ............. 29/897.2, 29/407.09, 407.1, 430, 464, 468, 559, 784, 29/787, 795, 799, 822, 824, 281.1, 281.4; 269/289 R, 296, 297, 303, 319, 320, 909
See application file for complete search history.

(56) References Cited

U.S. PATENT DOCUMENTS

| 5,907,489 | A * | 5/1999 | Elliott ........................ 700/97 |
| 6,637,737 | B1 * | 10/2003 | Beecherl et al. ............... 269/71 |
| 6,687,971 | B2 * | 2/2004 | Nakamura ................... 29/430 |
| 6,835,909 | B2 * | 12/2004 | Nakamura et al. ......... 219/86.7 |
| 6,877,729 | B2 * | 4/2005 | Lin et al. ...................... 269/25 |
| 2002/0124377 | A1 * | 9/2002 | Nakamura ................... 29/430 |

* cited by examiner

*Primary Examiner*—Jermie E Cozart
(74) *Attorney, Agent, or Firm*—Brooks Kushman P.C.

(57) ABSTRACT

A vehicle body assembly line locator assembly (16) includes locators (18) driven by horizontal longitudinal X, horizontal sideways Y and vertical Z power operated actuators (50. 58. 72) and having locator pins (82) received by vehicle body positioning holes (84) upon upward movement to provide accurate positioning. As the locator pins (82) are moved upwardly and initially move into the vehicle body positioning holes (84), the horizontal power operated actuators (50,58) are back driven. The upward movement is continued so that vertical rest surfaces (80) of locator heads (78) contact the vehicle body (20) and provide lifting thereof upwardly off a system conveyor, and the power operated actuators then move the vehicle body to the proper positioning for further assembly.

20 Claims, 4 Drawing Sheets

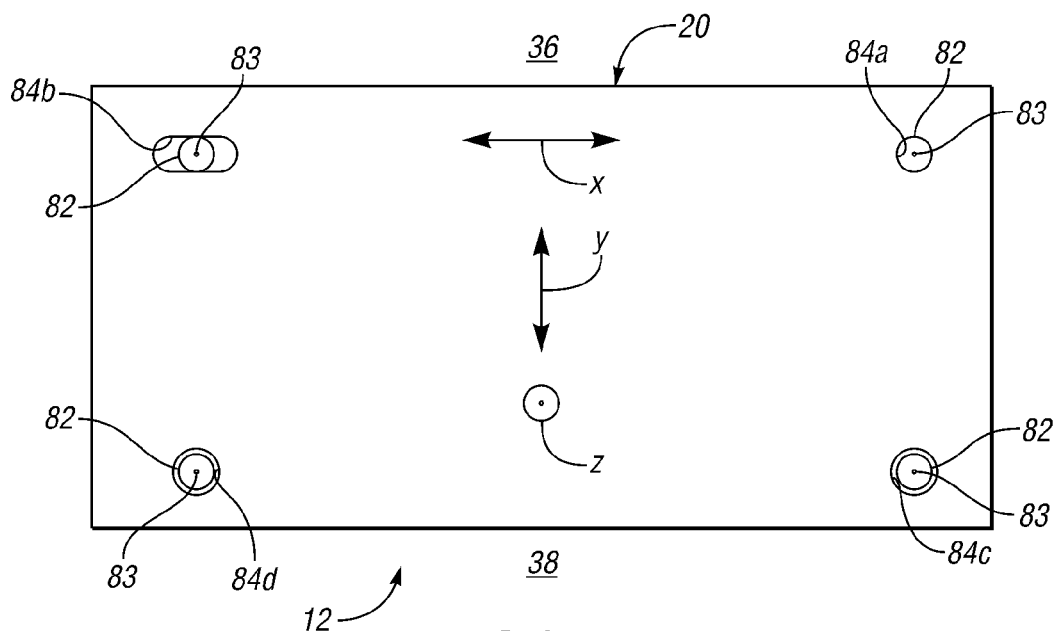
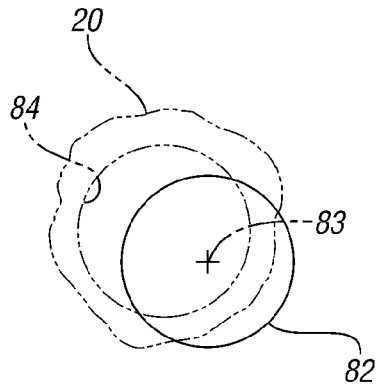
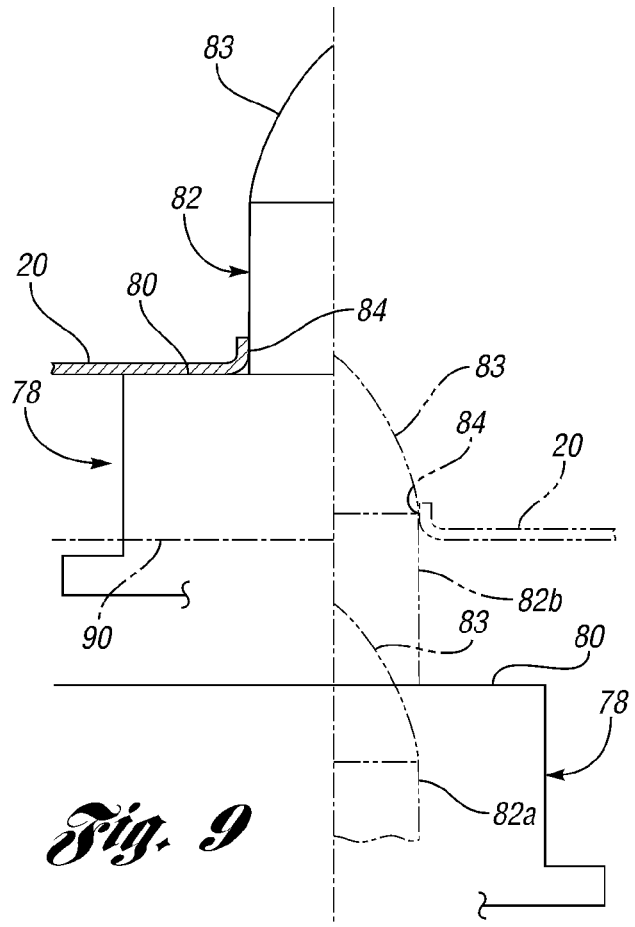

ASSEMBLY LINE VEHICLE BODY POSITIONING

CROSS-REFERENCE TO RELATED APPLICATIONS

This application claims the benefit of U.S. provisional application Ser. No. 60/817,222 filed Jun. 28, 2006.

BACKGROUND OF THE INVENTION

1. Field of the Invention

This invention relates to an adjustable locator assembly and a method for locating a partially assembled vehicle body at an assembly station of an assembly line for further assembly of vehicle body components.

2. Background Art

Vehicle bodies conventionally include formed sheet metal parts that are assembled to each other by welding or otherwise to provide the assembled vehicle body. One conventional way in which such assembly begins is by mounting of formed sheet metal parts on a pallet that is initially moved through an assembly line to secure the parts to each other and provide a partially assembled vehicle body. Thereafter, the partially assembled vehicle body can be moved by a conveyor to different assembly stations along the factory floor to provide further assembly of components to the vehicle body. Such assembly stations have previously included guides that permit the partially assembled vehicle body to be lowered by the conveyor and guided into the proper location at the assembly station so that further assembly can proceed with the partially assembled vehicle body properly located for the further assembly.

When a vehicle body assembly line is designed to manufacture more than one model vehicle body, the space requirements often do not permit the use of multiple conventional locator guides that provide the partial vehicle body positioning upon lowering of the partially assembled vehicle body at the assembly station in the manner which has previously been done.

SUMMARY OF THE INVENTION

One object of the present invention is to provide an improved locator assembly for a vehicle body assembly line for use in an assembly station to assemble vehicle body formed metal parts to a partially assembled vehicle body.

In carrying out the above object, the locator assembly of the invention includes a plurality of locators each of which includes a locator member for mounting a locator head having a vertical rest surface for supporting the partially assembled vehicle body along a vertical axis. At least a pair of the mounted locator heads each have a locator pin projecting upwardly from its vertical rest surface to provide horizontal positioning of the partially assembled vehicle body. Each of the locators including longitudinal X, sideways Y, and vertical Z power operated actuators for driving the locator member thereof in longitudinal, sideways, and vertical directions with respect to the locator assembly. A control for the power operated actuators selectively controls the vertical positioning of each locator member while allowing longitudinal and sideways movement thereof in a horizontal plane so positioning holes in the partially assembled vehicle body receive the locator pins upon relative vertical movement between the locator members and the partially assembled vehicle body and back drive the power operated actuators of the locator members having the locator pins horizontally in longitudinal and sideway directions as necessary as the vertical rest surfaces of the locator members move into supporting contact with the partially assembled vehicle body. The control subsequently operates the power operated actuators of the locators as necessary to move the locator members and the partially assembled vehicle body supported thereby to the proper position for further assembly.

At least some of the locator pins as disclosed have clamps movable between: unclamped positions to allow the locator pin movement into the vehicle body positioning holes; and clamped positions for clamping the partially assembled vehicle body against the vertical rest surfaces of the locator heads. Furthermore, in the disclosed locator assembly, the control moves the locator members upwardly to provide the relative vertical movement thereof with respect to the partially assembled vehicle body as the locator pins are received by the positioning holes of the partially assembled vehicle body to provide the horizontal back driving of the locator members as necessary as the vertical rest surfaces of the locator heads mounted on the locator members move into supporting contact with the partially assembled vehicle body before the control subsequently operates the locators as necessary to move the locator members and the partially assembled vehicle body supported thereby to the proper position for further assembly.

All of the locator pins as disclosed include clamps for clamping the partially assembled vehicle body against their associated vertical rest surfaces of the locator heads. Furthermore, as disclosed, the locator pins each projects upwardly from its vertical rest surface with a round shape. The locator head of one of the locator members is disclosed as including a locator pin for providing horizontal location of the partially assembled vehicle body in both longitudinal and sideways horizontal directions and the locator head of another of the locator members includes a locator pin for providing horizontal location of the partially assembled vehicle body in one of the longitudinal and sideways horizontal directions. Also, the locators having the locator heads whose locator pins provide the horizontal positioning of the partially assembled vehicle body are disclosed as being located at one lateral side of the assembly station. In addition, the assembly station has an opposite lateral side including a plurality of locators each of which includes a locator head having a vertical rest surface for providing vertical positioning of the partially assembled vehicle body.

Another object of the present invention is to provide an improved method for locating a partially assembled vehicle body at an assembly station of an assembly line for further assembly.

In carrying out the immediately preceding object for locating a partially assembled vehicle body at an assembly station of an assembly line for further assembly, the method is performed by conveying the partially assembled vehicle body to the assembly station above locators thereof which have locator members that mount locator heads including vertical rest surfaces and at least a pair of which have upwardly projecting locator pins. Power operated actuators of each locator initially position the locator members of the locators in predetermined longitudinal X, sideways Y, and vertical Z positions. Relative vertical movement between the locator members and the partially assembled vehicle body is provided while allowing longitudinal and sideways movement of the locator members in a horizontal plane so positioning holes in the partially assembled vehicle body receive the locator pins and back drive the power operated actuators of the locator members having the locator pins horizontally in longitudinal and sideway directions as necessary as the vertical rest surfaces of locator members move into supporting contact with the partially assembled vehicle body. Subsequently the power operated actuators of the locators move the locator members as necessary to position the partially assembled vehicle body supported thereby to a predetermined position for the further assembly.

The method as disclosed is performed by moving the partially assembled vehicle body to the assembly station over locators at least some of whose locator pins include clamps that are positioned in unclamped positions as the locator pins are received by the positioning holes of the partially assembled vehicle body, and the clamps subsequently are moved to clamped positions to clamp the partially assembled vehicle body against the vertical rest surfaces of the associated locator heads. Also, the locator members are disclosed as being moved upwardly to provide the relative vertical movement of the locator pins with respect to the partially assembled vehicle body as the locator pins are received by the positioning holes of the partially assembled vehicle body to provide the horizontal back driving of the locator members as necessary as the vertical rest surfaces of the locator heads mounted by the locator members move into supporting contact with the partially assembled vehicle body. In addition, the partially assembled vehicle body is disclosed as being conveyed into the assembly station over locators whose locator heads have locator pins that each include a clamp for clamping the partially assembled vehicle body. Furthermore, the partially assembled vehicle body is also disclosed as being conveyed into the assembly station over locators whose locator pins each projects upwardly from its vertical rest surface with a round shape.

The method as disclosed is performed by moving the partially assembled vehicle body into the assembly station over locators one of whose locator member mounts a locator head having a locator pin for providing horizontal location of the partially assembled vehicle body in both longitudinal and sideways horizontal directions and another of whose locator member mounts a locator head having a locator pin for providing horizontal location of the partially assembled vehicle body in one of the longitudinal and sideways horizontal directions. More specifically, the partially assembled vehicle body is conveyed into the assemble station over locators on one lateral side thereof one of whose locator member mounts a locator head having a locator pin for providing horizontal location of the partially assembled vehicle body in both longitudinal and sideways horizontal directions and another of whose locator member mounts a locator head having a locator pin for providing horizontal location of the partially assembled vehicle body in the sideways horizontal direction. Also, the partially assembled vehicle body is conveyed into the assembly station over locators on the opposite lateral side thereof each of whose locator heads includes a vertical rest surface for providing vertical positioning of the partially assembled vehicle body. In addition, the partially assembled vehicle body is conveyed into the assembly station whose locators at the opposite lateral side of thereof mount locator heads having upwardly projecting locator pins that project upwardly to be received within the positioning holes of the partially assembled vehicle body during the upward movement of the locator members. Furthermore, the partially assembled vehicle body is conveyed into the assembly station whose locators each mount a locator head including a locator pin having a clamp movable between clamped and unclamped positions for use in clamping the partially assembled vehicle body.

The objects, features and advantages of the present invention are readily apparent from the following detailed description of the preferred embodiment when taken in connection with the accompanying drawings.

BRIEF DESCRIPTION OF THE DRAWINGS

FIG. 7 is a top plan view that schematically illustrates the manner in which a vehicle body is positioned by four locators of the invention at the assembly station.

FIG. 8 is a top plan view that illustrates the manner in which a locator pin of each locator is moved into a positioning hole of the vehicle body during the locating process.

FIG. 9 is a schematic elevational view that illustrates the movement of the locator pin into the vehicle body positioning hole so that the vehicle body is supported by a vertical rest surface of the locator head from which the locator pin projects upwardly.

DETAILED DESCRIPTION OF THE PREFERRED EMBODIMENT

Figure 1:
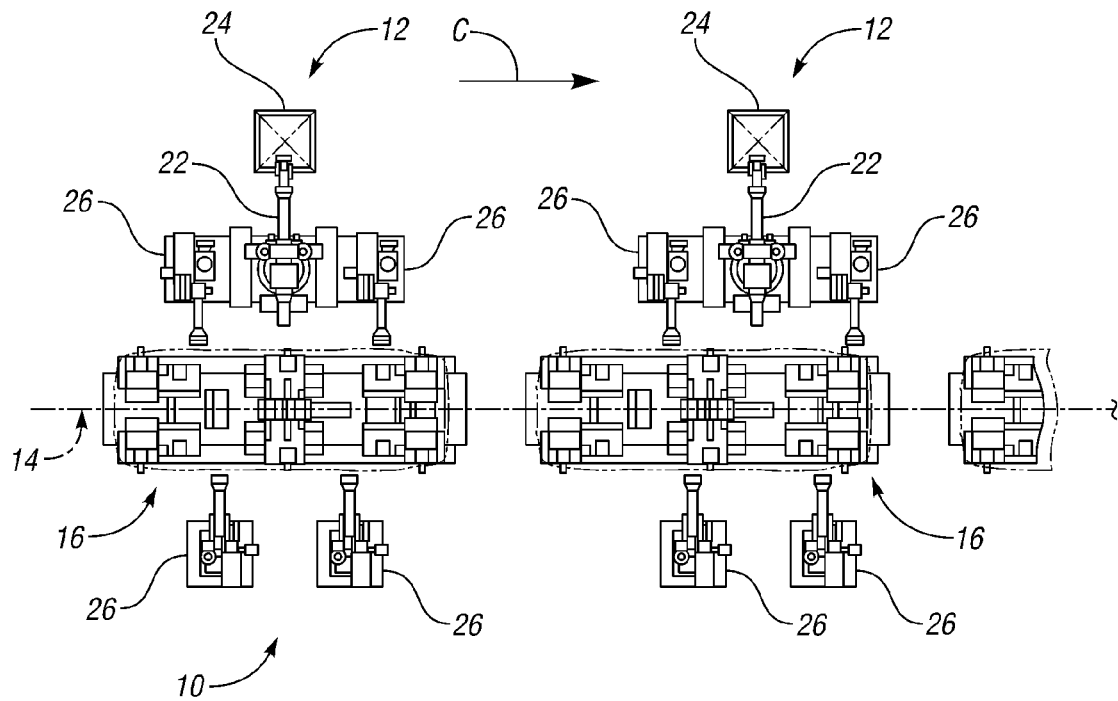
FIG. 1 is a partial top plan view of a vehicle body assembly line including assembly stations which have locator assemblies constructed in accordance with the invention to perform the method thereof for locating partially assembled vehicle bodies for further assembly.
Figure 4:
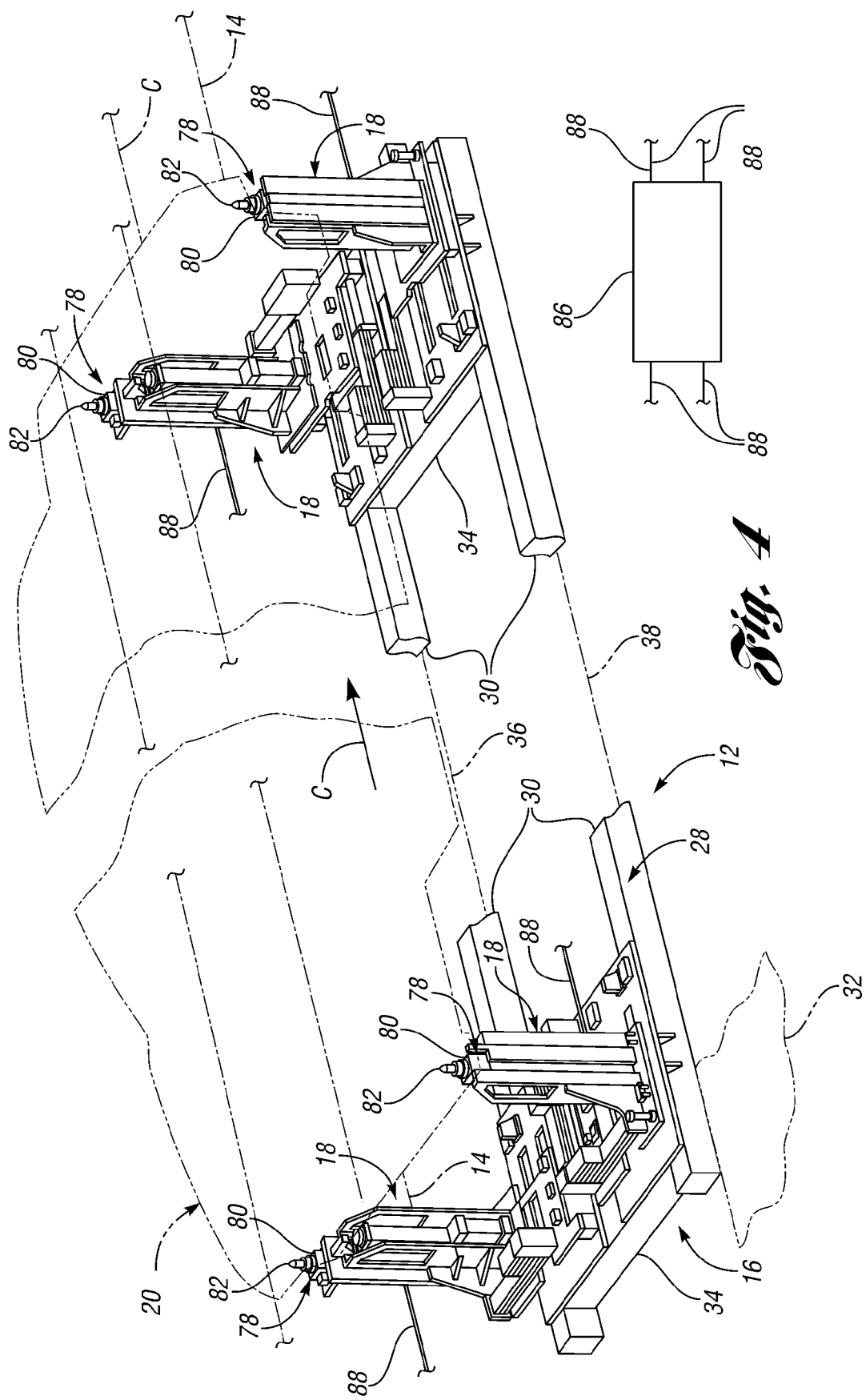
FIG. 4 is a broken away perspective view of a vehicle body assembly station where the locators of the locator assembly provide location of the vehicle body illustrated by phantom line representation.

With reference to FIG. 1, a partially illustrated vehicle assembly line is generally indicated by 10 and includes assembly stations 12 for assembling formed metal parts to a partially assembled vehicle body upon conveyance thereof along a schematically indicated conveyor 14 upon movement from the left toward the right as illustrated by the direction of conveyance shown by arrow C. Each assembly station 12 as illustrated in FIG. 4 includes an adjustable locator assembly 16 having a plurality of locators 18 for positioning a partially assembled vehicle body 20 upon conveyance thereto by the conveyor 14. The locator assembly 16 and its locators 18 as well as the method for locating the partially assembled vehicle body 20 in accordance with the invention will be described in an integrated manner with each other in order to facilitate an understanding of all aspects of the invention.

As illustrated in FIG. 4, each assembly station includes a material handling robot 22 for transferring formed metal parts from a supply 24 and also includes processing robots 26 for providing part assembly such as by welding, adhesive application, fastener securement, etc. When performing such assembly, it is important for the partially assembled vehicle body 20 shown in FIG. 4 to be accurately located so that the robotic assembly can be performed within the required tolerances of the specified locations.

With reference to FIG. 4, a base 28 of the assembly station 12 includes longitudinal base members 30 supported on the partially indicated factory floor 32 along with cross base members 34. Each locator 18 of the locator assembly 16 is mounted on the base members 28 and 34, with four shown at the opposite lateral sides 36 and 38 of the assembly station and at its opposite ends so as to be generally located in corner locations of the partially assembled vehicle body 20.

Figure 5:
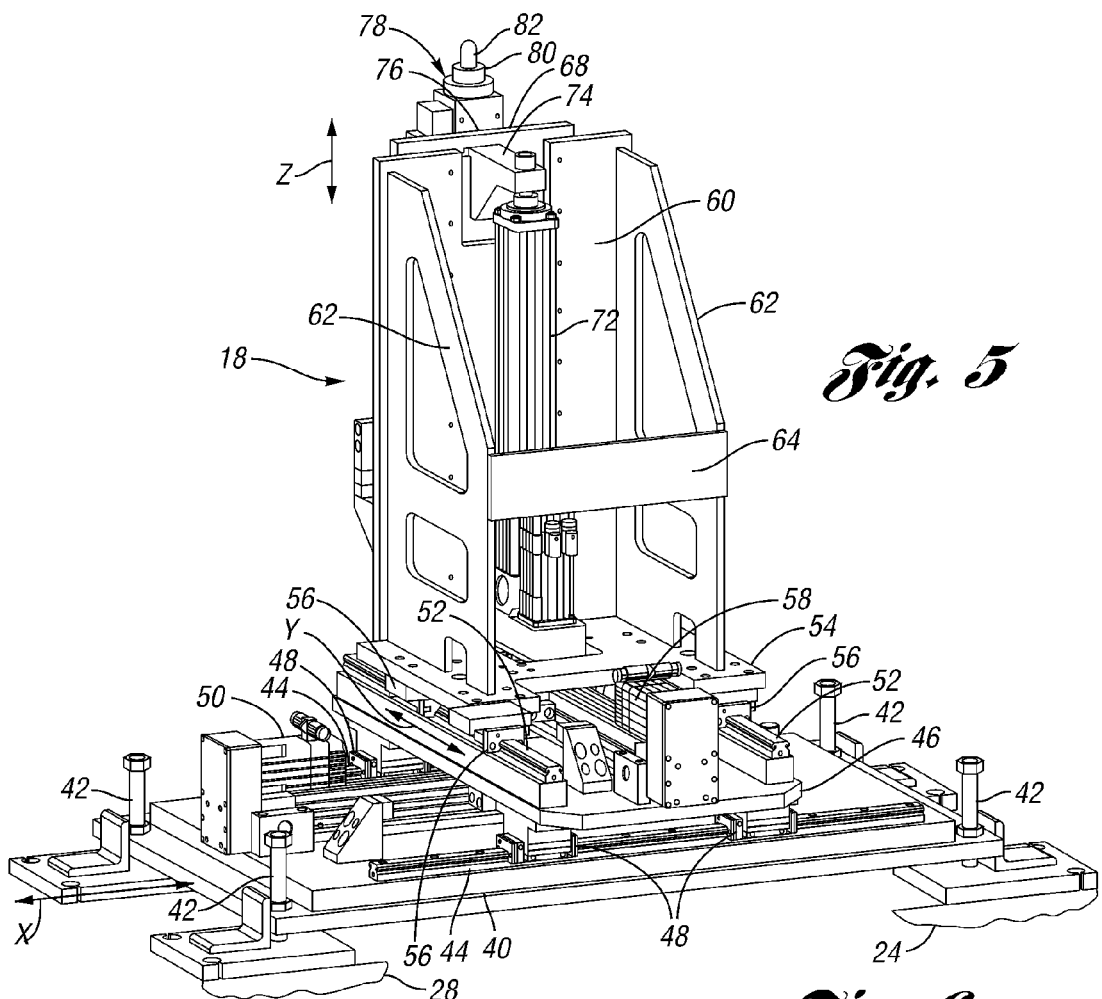
FIG. 5 is a perspective view of a locator constructed in accordance with the invention to provide the locating method of the invention.

With reference to FIGS. 4 and 5, each locator 18 has a base plate 40 secured by threaded connections 42 to the factory floor base 28 in a suitable manner and supporting a pair of tracks 44 on which a movable plate 46 is supported by linear bearings 48 for movement along a longitudinal X direction with respect to the assembly station, which corresponds to the direction of conveyance previously described. A power linear actuator 50 is mounted on the base plate 40 and connected to the movable plate 46 to provide power operated movement in the horizontal longitudinal X direction. Tracks 52 on the movable plate 46 support another movable plate 54 by linear bearings 56 for movement in the sideways Y horizontal direction which is laterally with respect to the direction of conveyance at the assembly station. Another power actuator 58 is mounted on the movable plate 46 and connected to the movable plate 54 to provide power operated movement thereof in the horizontal sideways Y direction. A vertical plate 60 is supported and braced on the movable plate 54 by side plates 62 and a cross plate 64. Vertical tracks 66 (FIG. 6) support a vertically movable locator member 68 by linear bearings 70 for movement in the vertical Z direction. A power operated actuator 72 mounted by the movable plate 54 has a connection 74 to the upper end of the locator member 68 to provide its vertical movement and positioning. The locator member 68 is thus movable and positionable in the horizontal longitudinal X, horizontal sideways Y, and vertical Z directions by the actuators 50, 58 and 72 in cooperation with the tracks and linear bearings to provide the required positioning. The power actuators 50, 58 and 72 are preferably of the ball screw type driven by electric motors.

Figure 2:
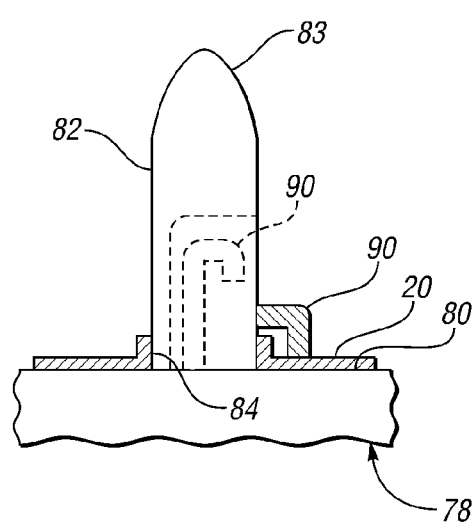
FIG. 2 is a view that illustrates the manner in which a locator head mounted on one locator of the locator assembly provides vehicle body location and clamping.
Figure 3:
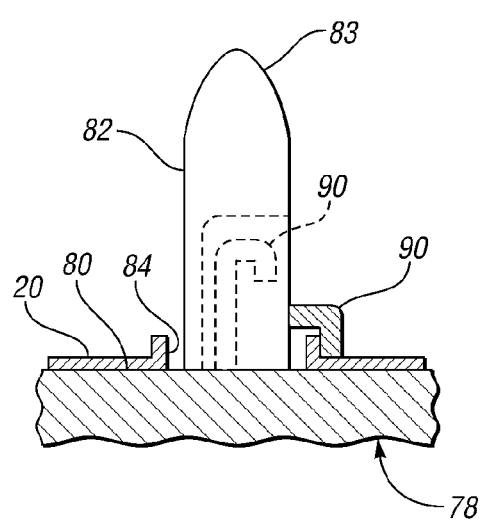
FIG. 3 is a view similar to FIG. 2 but illustrating another locator pin that provides clamping while accommodating for spacing tolerances of the vehicle body.
Figure 6:
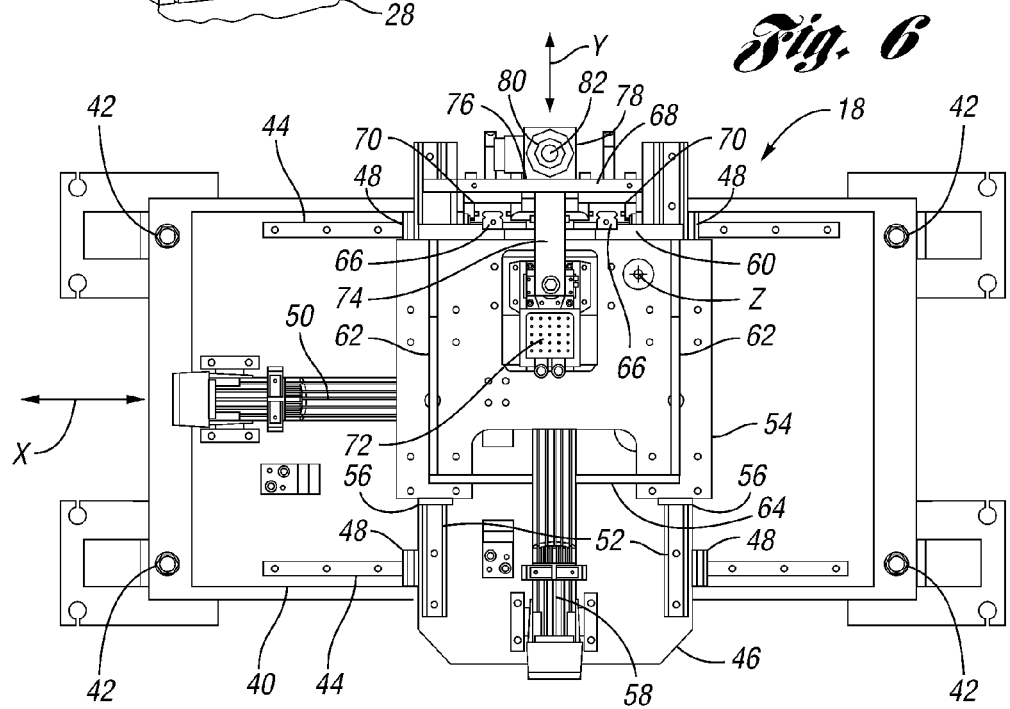
FIG. 6 is a top plan view of the locator illustrated in FIG. 5.

As show in FIGS. 5 and 6, the upper end of the vertical locator member 66 has a location 76 at which a locator head 78 is mounted. There is an industry standard mounting protocol for such locator heads so that locator heads from different manufacturers can all be utilized with mounting holes, threading specification, etc. for providing flexibility in mounting. Each locator head 78 has a vertical rest surface 80 as illustrated in FIGS. 2 and 3 for supporting the partially assembled vehicle body along the vertical axis in the Z direction. At least a pair of the mounted locator heads 78, and actually all of the locator heads as illustrated in FIG. 4, each have a locator pin 82 projecting upwardly from its associated vertical rest surface 80 and having an upper pointed end 83. As is hereinafter more fully described, the vehicle body 20 has positioning holes 84 (FIGS. 2, 4 and 7-9) that the locator pins 82 project upwardly to provide positioning.

As shown in FIG. 4, the locator assembly 16 includes a control 86 having connections 88 to the locators 18 to provide control of their operation. As the partially assembled vehicle body 20 is moved to the assembly station 12 by the conveyor 14, each locator pin 82 is sufficiently aligned with the vehicle body positioning holes so that upward movement of all of the locator pins provides movement of their upper generally pointed ends 83 into the associated positioning hole so that the vehicle body be supported by the vertical rest surface 80 of the associated locator head 78 after movement to the required vertical position. During such upward movement, the control 86 allows the horizontal longitudinal X power actuator 50 and the horizontal sideways Y power actuator 58 to be back driven by the associated locator pin and vehicle body positioning hole to accommodate for any initial misalignment. The control 86 subsequently moves each locator 18 as necessary to provide proper positioning in the horizontal longitudinal X and the horizontal sideways Y direction as well as in the vertical Z direction for the further assembly to be performed.

It should be appreciated that while the back driving the locators in the horizontal longitudinal X and horizontal sideways Y directions can also be performed with the relative vertical movement between the locator pins and the vehicle body by lowering the vehicle body at the assembly station, it is preferable to do the vertical upward driving of the locator heads 78 mounted on the associated locator members 68 because the weight of the vehicle body and lowering thereof cannot be performed at as uniform a rate as the upward locator pin movement through the power operated locators, tracks and linear bearings previously described.

As illustrated in FIGS. 2 and 3, at least some of the locator pins 82 have clamps 90 that are movable between the phantom line indicated unclamped positions and the solid line indicated clamped positions. In the phantom line indicated unclamped positions, the clamps 90 allow the movement of each locator pin 82 into the associated vehicle body positioning hole 84. After the vertical rest surface 80 of the locator head 78 has contacted the vehicle body 20, the clamp 90 is moved to the solid line indicated clamped position to hold the vehicle body in position for the associated assembly at the respective assembly station. Actually, the locator pin 82 of each of the four locator heads 78 illustrated in FIG. 4 has one of the clamps 90 to provide the vehicle body, although in some situations it may not be necessary to have a clamp at each locator pin.

As illustrated in FIGS. 7 and 8, each of the locator pins 82 has a round shape projecting upwardly from the associated rest surface and the previously mentioned rounded and pointed upper end 83 that facilitates the movement into the associated vehicle body positioning hole 84.

With reference to the top plan view of FIG. 7, the one positioning pin 82 shown at the upper right location is received within a positioning hole 84*a* of a round shape with minimal tolerance spacing so that this locator pin provides horizontal positioning of the partially assembled vehicle body 20 in both longitudinal X and sideways Y horizontal directions. Furthermore, the vehicle body positioning hole 84*b* at the upper left location receives a locator pin 82 and has a somewhat elongated shape along the longitudinal X direction with minimal tolerance spacing along the sideways Y direction so that this locator pin provides horizontal location of the partially assembled vehicle body in one of the horizontal directions, specifically the sideways Y direction, and thereby prevents rotation of the vehicle body 20 about its positioning hole 84*a* and the associated locator pin 82 so the vehicle body is properly positioned. The locator pins 82 at the lower right and lower left locations receive locator pins 82 and have tolerance spacing as shown in FIG. 3 so as to accommodate for any dimensional differences of the partially assembled vehicle body with respect to the other two positioning holes 84*a* and 84*b* shown in FIG. 7. Thus, the lower right and lower left locator pins 82 while received within the associated vehicle body positioning holes 84 do not provide the final positioning, which is actually provided by the other two locator pins 82 at the upper right and upper left locations. It should be appreciated that it is also possible to provide the elongated positioning hole on the opposite lateral side 38 of the assembly station from the one side 36 where the minimal tolerance positioning hole 84*a* is located. However, in that case, the direction of the elongated positioning hole will then be in the sideways Y direction to prevent rotation about the upper right locator pin 82.

With reference to the operational view illustrated in FIG. 9, the locator head 78 moves the locator pin upwardly as previously described and upon reaching a position just below the vehicle body 20, where the distance of the upper end 83 of the locator pin as identified by 82a is approximately 10 millimeters below the vehicle body as shown by reference line 90, the control of the system both deactuates the power actuators that provide the driving in the horizontal longitudinal X and horizontal sideways Y directions and also decelerates the rate of upward locator pin movement. Thereafter as the locator pin moves upwardly at a slower rate to the next higher phantom line indicated position identified by 82b, the tapered upper end 83 of the locator pin moves into the positioning hole 84 and provides back driving of the locator pin as necessary to permit the upward movement and accommodate for any misalignment as previously discussed in connection with FIG. 8. When the upwardly moving vertical rest surface 80 of the locator head 78 contacts the lower side of the vehicle body 20 in its phantom line position, the continued upward movement lifts the vehicle body upwardly off the system conveyor. Thereafter as previously mentioned, the system control 86 shown in FIG. 4 operates the locator power actuators to move the partially assembled vehicle body to the design position for further assembly operations.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle body assembly line adjustable locator assembly for use in an assembly station to assemble vehicle body formed metal parts to a partially assembled vehicle body, the locator assembly comprising:
   a plurality of locators each of which includes a locator member for mounting a locator head having a vertical rest surface for supporting the partially assembled vehicle body along a vertical axis, and at least a pair of the mounted locator heads each having a locator pin projecting upwardly from its vertical rest surface to provide horizontal positioning of the partially assembled vehicle body;
   each of the locators including longitudinal X, sideways Y, and vertical Z power operated actuators for driving the locator member thereof in longitudinal, sideways, and vertical directions with respect to the locator assembly; and
   a control for the power operated actuators for selectively controlling the vertical positioning of each locator member while allowing longitudinal and sideways movement thereof in a horizontal plane so positioning holes in the partially assembled vehicle body receive the locator pins upon relative vertical movement between the locator members and the partially assembled vehicle body and back drive the power operated actuators of the locator members having the locator pins horizontally in longitudinal and sideway directions as necessary as the vertical rest surfaces of the locator members move into supporting contact with the partially assembled vehicle body, and the control subsequently operating the power operated actuators of the locators as necessary to move the locator members and the partially assembled vehicle body supported thereby to a proper position for further assembly.

2. A vehicle body assembly line adjustable locator assembly as in claim 1 wherein at least some of the locator pins have clamps movable between: unclamped positions to allow the locator pin movement into the vehicle body positioning holes; arid clamped positions for clamping the partially assembled vehicle body against the vertical rest surfaces of the locator heads.

3. A vehicle body assembly line adjustable locator assembly as in claim 2 wherein the control moves the locator members upwardly to provide the relative vertical movement thereof with respect to the partially assembled vehicle body as the locator pins are received by the positioning holes of the partially assembled vehicle body to provide the horizontal back driving of the locator members as necessary as the vertical rest surfaces of the locator heads mounted on the locator members move into supporting contact with the partially assembled vehicle body before the control subsequently operates the locators as necessary to move the locator members and the partially assembled vehicle body supported thereby to the proper position for further assembly.

4. A vehicle body assembly line adjustable locator assembly as in claim 3 wherein all of the locator pins include clamps for clamping the partially assembled vehicle body against their associated vertical rest surfaces of the locator heads.

5. A vehicle body assembly line adjustable locator assembly as in claim 3 wherein the locator pins each projects upwardly from its vertical rest surface with a round shape.

6. A vehicle body assembly line adjustable locator assembly as in claim 3 wherein the locator head of one of the locator members includes a locator pin for providing horizontal location of the partially assembled vehicle body in both longitudinal and sideways horizontal directions and the locator head of another of the locator members includes a locator pin for providing horizontal location of the partially assembled vehicle body in one of the longitudinal and sideways horizontal directions.

7. A vehicle body assembly line adjustable locator assembly as in claim 6 wherein the locators having the locator heads whose locator pins provide the horizontal positioning of the partially assembled vehicle body are located at one lateral side of the assembly station.

8. A vehicle body assembly line adjustable locator assembly as in claim 7 wherein the assembly station has an opposite lateral side including a plurality of locators each of which includes a locator head having a vertical rest surface for providing vertical positioning of the partially assembled vehicle body.

9. A vehicle body assembly line adjustable locator assembly for use in an assembly station to assemble vehicle body formed metal parts to a partially assembled vehicle body, the locator assembly comprising:
   a plurality of locators each of which includes a locator member for mounting a locator head having a vertical rest surface for supporting the partially assembled vehicle body along a vertical axis, and the mounted locator heads each having a locator pin projecting upwardly from its vertical rest surface to provide horizontal positioning of the partially assembled vehicle body;
   each of the locators including longitudinal X, sideways Y, and vertical Z power operated actuators for driving the locator member thereof in longitudinal, sideways, and vertical directions with respect to the locator assembly;
   the locator pin of each locator head having a clamp for clamping the partially assembled vehicle body against the associated vertical rest surface;

a control for the power operated actuators for moving the locator member upwardly while allowing longitudinal and sideways movement thereof in a horizontal plane so positioning holes in the partially assembled vehicle body respectively receive the locator pins and through the locator pins back drive the power operated actuators of the locator members horizontally in longitudinal and sideway directions as necessary as the vertical rest surfaces of locator members move into supporting contact with the partially assembled vehicle body, the locator head of one of the locator members including a locator pin for providing horizontal location of the partially assembled vehicle body in both longitudinal and sideways horizontal directions and the locator head of another of the locator members including a locator pin for providing horizontal location of the partially assembled vehicle body in one of the longitudinal and sideways horizontal directions, and the control subsequently moving each clamp to a clamped position to hold the partially assembled vehicle body against the associated vertical rest surface and the control also operating the power operated actuators of the locators as necessary to move the locator members and the partially assembled vehicle body supported thereby to a proper position for further assembly.

10. A method for locating a partially assembled vehicle body at an assembly station of an assembly line for further assembly, the method comprising:

conveying the partially assembled vehicle body to the assembly station above locators thereof which have locator members that mount locator heads including vertical rest surfaces and at least a pair of which have upwardly projecting locator pins;

initially positioning the locator members by power operated actuators of each locator in predetermined longitudinal X, sideways Y, and vertical Z positions;

providing relative vertical movement between the locator members and the partially assembled vehicle body while allowing longitudinal and sideways movement of the locator members in a horizontal plane so positioning holes in the partially assembled vehicle body receive the locator pins and back drive the power operated actuators of the locator members having the locator pins horizontally in longitudinal and sideway directions as necessary as the vertical rest surfaces of locator members move into supporting contact with the partially assembled vehicle body; and subsequently operating the power operated actuators of the locator members as necessary to position the partially assembled vehicle body supported thereby to a predetermined position for the further assembly.

11. A method for locating a partially assembled vehicle body as in claim 10 wherein the partially assembled vehicle body is moved to the assembly station over locators at least some of whose locator pins include clamps that are positioned in unclamped positions as the locator pins are received by the positioning holes of the partially assembled vehicle body, and the clamps subsequently being moved to clamped positions to clamp the partially assembled vehicle body against the vertical rest surfaces of the associated locator heads.

12. A method for locating a partially assembled vehicle body as in claim 11 wherein the locator members are moved upwardly to provide the relative vertical movement of the locator pins with respect to the partially assembled vehicle body as iLhe locator pins are received by the positioning holes of the partially assembled vehicle body to provide the horizontal back driving of the locator members as necessary as the vertical rest surfaces of the locator heads mounted by the locator members move into supporting contact with the partially assembled vehicle body.

13. A method for locating a partially assembled vehicle body as in claim 12 wherein the partially assembled vehicle body is conveyed into the assembly station over locators whose locator heads have locator pins that each include a clamp for clamping the partially assembled vehicle body.

14. A method for locating a partially assembled vehicle body as in claim 12 wherein the partially assembled vehicle body is conveyed into the assembly station over locators whose locator pins each projects upwardly from its vertical rest surface with a round shape.

15. A method for locating a partially assembled vehicle body as in claim 12 wherein the partially assembled vehicle body is conveyed into the assembly station over locators one of whose locator member mounts a locator head having a locator pin for providing horizontal location of the partially assembled vehicle body in both longitudinal and sideways horizontal directions and another of whose locator member mounts a locator head having a locator pin for providing horizontal location of the partially assembled vehicle body in one of the longitudinal and sideways horizontal directions.

16. A method for locating a partially assembled vehicle body as in claim 15 wherein the partially assembled vehicle body is conveyed into the assemble station over locators on one lateral side thereof one of whose locator member mounts a locator head having a locator pin for providing horizontal location of the partially assembled vehicle body in both longitudinal and sideways horizontal directions and another of whose locator member mounts a locator head having a locator pin for providing horizontal location of the partially assembled vehicle body in the sideways horizontal direction.

17. A method for locating a partially assembled vehicle body as in claim 16 wherein the partially assembled vehicle body is conveyed into the assembly station over locators on the opposite lateral side thereof each of whose locator heads includes a vertical rest surface for providing vertical positioning of the partially assembled vehicle body.

18. A method for locating a partially assembled vehicle body as in claim 17 wherein the partially assembled vehicle body is conveyed into the assembly station whose locators at the opposite lateral sides thereof mount locator heads having upwardly projecting locator pins that project upwardly to be received within the positioning holes of the partially assembled vehicle body during the upward movement of the locator members.

19. A method for locating a partially assembled vehicle body as in claim 18 wherein the partially assembled vehicle body is conveyed into the assembly station whose locators each mount a locator head including a locator pin having a clamp movable between clamped and unclamped positions for use in clamping the partially assembled vehicle body.

20. A method for locating a partially assembled vehicle body at an assembly station of an assembly line for further assembly, the method comprising:

conveying the partially assembled vehicle body to the assembly station above Each locators thereof which have locator members mounting locator heads having vertical rest surfaces and upwardly projecting locator pins;

initially positioning the locator members by power operated actuators of each locator in predetermined longitudinal X, sideways Y, and vertical Z positions;

moving the locator members upwardly toward the partially assembled vehicle body while allowing longitudinal and sideways movement of the locator members in a horizontal plane so positioning holes in the partially assembled vehicle body respectively receive the locator pins and back drive the power operated actuators of the locator members horizontally in longitudinal and sideways directions as necessary as the vertical rest surfaces of locator heads move into supporting contact with the partially assembled vehicle body; and clamping the partially assembled vehicle body against at least some of the vertical rest surfaces of the locator heads and operating the power operated actuators of the locator members as necessary to position the partially assembled vehicle body supported thereby to a predetermined position for the further assembly.

* * * * *

UNITED STATES PATENT AND TRADEMARK OFFICE
CERTIFICATE OF CORRECTION

PATENT NO.       : 7,469,473 B2  
APPLICATION NO.  : 11/758226  
DATED            : December 30, 2008  
INVENTOR(S)      : Mark A. Savoy Page 1 of 1

It is certified that error appears in the above-identified patent and that said Letters Patent is hereby corrected as shown below:

Column 10, Line 24, Claim 16:

Delete "assemble" and insert -- assembly --.

Column 10, Line 55, Claim 20:

Delete "Each".

Signed and Sealed this

Seventeenth Day of February, 2009

JOHN DOLL  
*Acting Director of the United States Patent and Trademark Office*